United States Patent
Ravichandran et al.

(10) Patent No.: US 12,304,457 B2
(45) Date of Patent: May 20, 2025

(54) SYSTEM AND METHOD FOR STARTING AN ENGINE

(71) Applicant: Ford Global Technologies, LLC, Dearborn, MI (US)

(72) Inventors: Maruthi Ravichandran, Dearborn, MI (US); Rajit Johri, San Francisco, CA (US); Steven Anatole Frait, Milan, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 227 days.

(21) Appl. No.: 17/821,387

(22) Filed: Aug. 22, 2022

(65) Prior Publication Data
US 2024/0059274 A1 Feb. 22, 2024

(51) Int. Cl.
| | | |
|---|---|---|
| *B60W 20/40* | (2016.01) | |
| *B60W 10/02* | (2006.01) | |
| *B60W 10/06* | (2006.01) | |
| *B60W 10/08* | (2006.01) | |
| *B60W 10/103* | (2012.01) | |

(52) U.S. Cl.
CPC .......... *B60W 20/40* (2013.01); *B60W 10/02* (2013.01); *B60W 10/06* (2013.01); *B60W 10/08* (2013.01); *B60W 10/103* (2013.01)

(58) Field of Classification Search
None
See application file for complete search history.

(56) References Cited

U.S. PATENT DOCUMENTS

| | | |
|---|---|---|
| 8,594,913 B2 | 11/2013 | Steuernagel |
| 9,731,710 B2 | 8/2017 | Gibson et al. |
| 9,791,040 B2 | 10/2017 | Nedorezov et al. |
| 10,272,907 B2 | 4/2019 | Johri et al. |
| 10,450,979 B2 | 10/2019 | Gibson et al. |
| 2013/0296121 A1 | 11/2013 | Gibson et al. |
| 2015/0246669 A1 | 9/2015 | Wang et al. |
| 2015/0360675 A1* | 12/2015 | Nefcy ................. B60W 20/00 903/902 |
| 2017/0259808 A1 | 9/2017 | Makled et al. |
| 2017/0259810 A1 | 9/2017 | Zhang et al. |
| 2018/0022353 A1* | 1/2018 | Thompson ............. F16D 41/00 701/22 |
| 2018/0244262 A1 | 8/2018 | Ruybal et al. |
| 2018/0257638 A1* | 9/2018 | Ortmann ............... B60W 20/30 |

(Continued)

FOREIGN PATENT DOCUMENTS

DE 102010060681 A1 5/2012

OTHER PUBLICATIONS

Ravichandran, M et al., "Methods and System for Starting an Engine" U.S. Appl. No. 17/443,925, filed Jul. 28, 2021, 35 pages.

(Continued)

*Primary Examiner* — Adam D Tissot
(74) *Attorney, Agent, or Firm* — David Kelley; McCoy Russell LLP

(57) ABSTRACT

Systems and methods for operating a driveline of a hybrid vehicle are presented. In one example, an electrically driven transmission fluid pump may be deactivated in response to an engine pull-up request so that a driveline disconnect clutch may provide more consistent torque transfer capacity during closing of the driveline disconnect clutch.

17 Claims, 4 Drawing Sheets

(56) References Cited

U.S. PATENT DOCUMENTS

| | | |
|---|---|---|
| 2018/0306157 A1 | 10/2018 | Lee et al. |
| 2018/0340503 A1 | 11/2018 | Kim |
| 2019/0376483 A1 | 12/2019 | Khafagy et al. |
| 2020/0080527 A1 | 3/2020 | Khafagy et al. |
| 2020/0165987 A1 | 5/2020 | Cunningham et al. |
| 2020/0269702 A1 | 8/2020 | Meyer et al. |

OTHER PUBLICATIONS

Ravichandran, M et al., "Methods and System for Controlling an Engine," U.S. Appl. No. 17/449,209, filed Sep. 28, 2021, 42 pages.

Ravichandran, M et al., "Methods and System for Reserving Torque for Engine Starting," U.S. Appl. No. 17/449,216, filed Sep. 28, 2021, 41 pages.

\* cited by examiner

SYSTEM AND METHOD FOR STARTING AN ENGINE

FIELD

The present description relates to methods and a system for starting an internal combustion engine of a hybrid vehicle.

BACKGROUND AND SUMMARY

A hybrid vehicle may initiate an engine pull-up (e.g., rotation of the engine by an electric machine from a state where the engine is not rotating) request when the hybrid vehicle is stationary, in creep mode, launching, or while the hybrid vehicle is moving at times other than when the hybrid vehicle is launching. The engine pull-up request may be initiated in response to an increasing driver demand, a low state of battery charge, or other vehicle operating conditions. During an engine pull-up, a driveline disconnect clutch may be closed to start the engine and/or couple the engine to the remainder of the hybrid vehicle driveline after the engine is started. However, the torque transferring capacity of the driveline disconnect clutch may be inconsistent when torque converter impeller speed is low and an electric transmission fluid pump is activated. The torque converter impeller drives a mechanical transmission fluid pump and the electric transmission fluid pump may be activated to supply sufficient capacity to cool an electric machine. Inconsistent torque capacity for the driveline disconnect clutch may cause driveline torque disturbances that may be objectionable to vehicle occupants.

The inventors herein have recognized the above-mentioned issue and have developed a method for operating a vehicle, comprising: via one or more controllers, deactivating an activated electric transmission fluid pump in response to an engine pull-up request; and via the one or more controllers, starting an engine of the vehicle via an engine starting device after deactivating the activated electric transmission fluid pump.

By deactivating an electric transmission fluid pump in response to an engine pull-up request, it may be possible to provide the technical result of engine starts that more repeatable as compared to starting the engine with the electric transmission fluid pump being activated. In particular, fluid pressure that builds in the driveline disconnect clutch and is supplied by a mechanically driven transmission fluid pump and the electrically driven transmission fluid pump may be delivered in a more consistent manner when the electrically driven pump is deactivated when a torque converter impeller speed is low. Consequently, the torque transfer capacity of the driveline disconnect clutch may be more consistent from one engine start to a next engine start.

The present description may provide several advantages. In particular, the approach may reduce driveline torque disturbances. Further, the approach may reduce complexity of driveline disconnect clutch torque capacity control. Additionally, the approach may improve a vehicle's drivability.

The above advantages and other advantages, and features of the present description will be readily apparent from the following Detailed Description when taken alone or in connection with the accompanying drawings.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
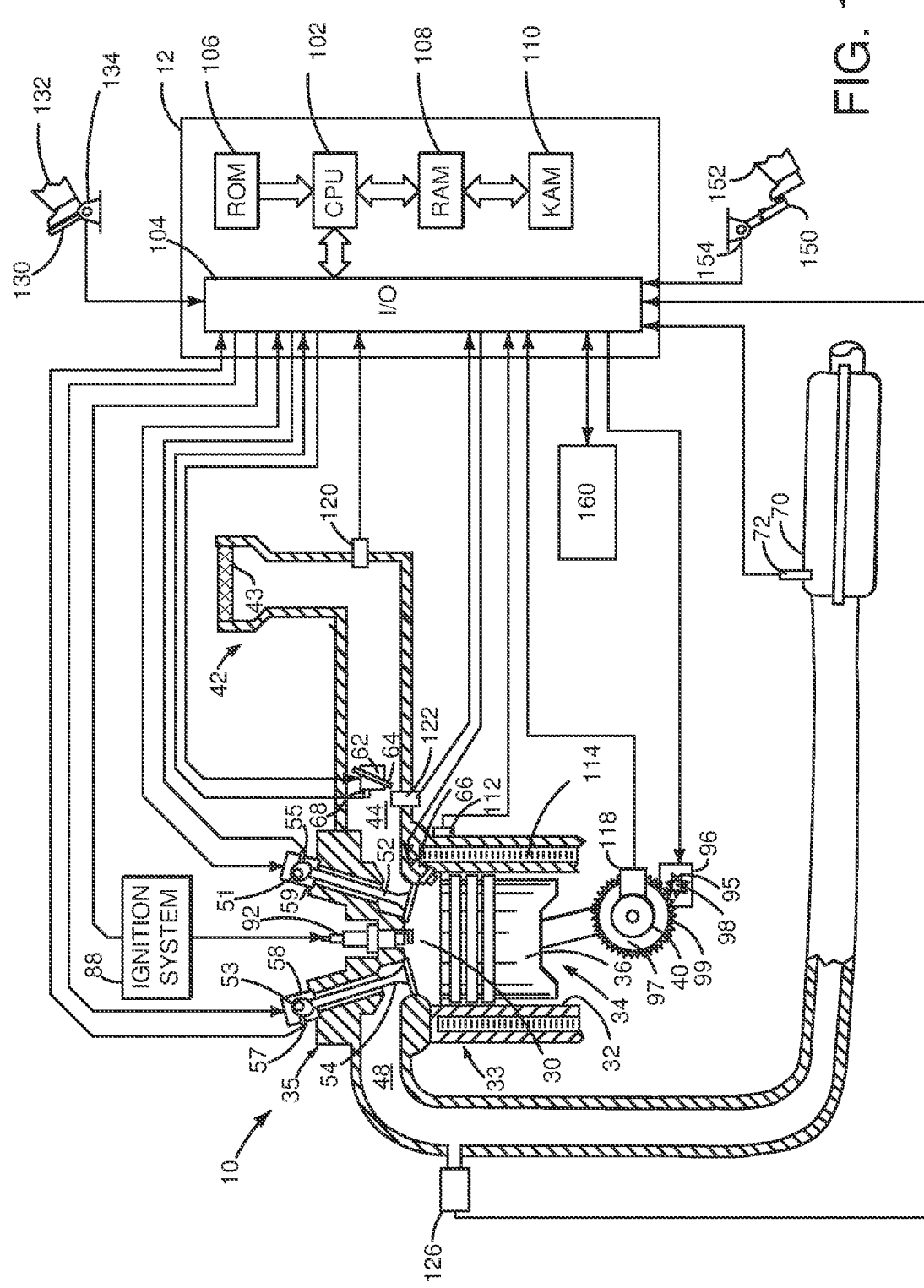
FIG. 1 is a schematic diagram of an engine.
Figure 2:
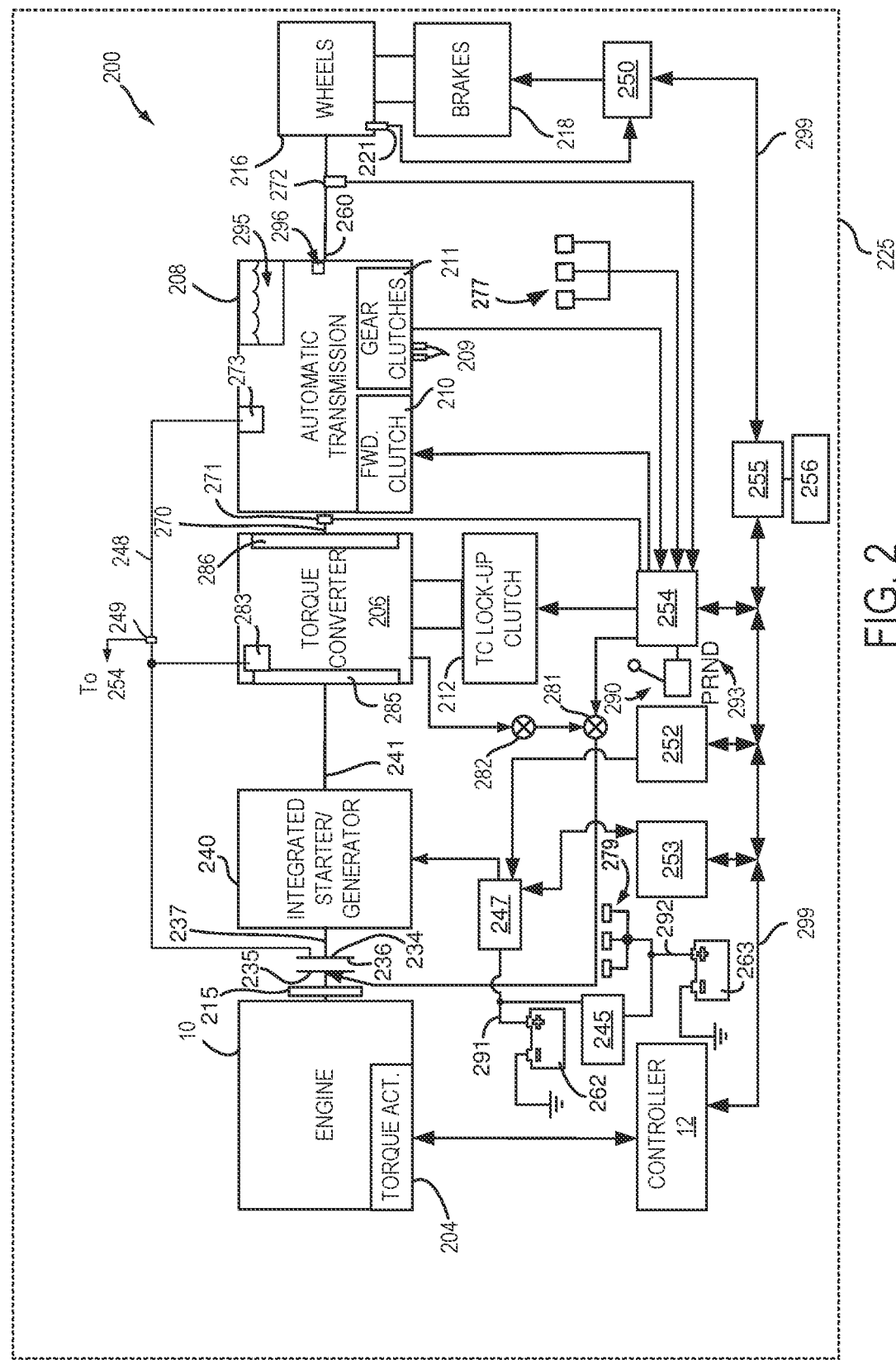
FIG. 2 is a schematic diagram of a hybrid vehicle driveline including the engine of FIG. 1.
Figure 3:
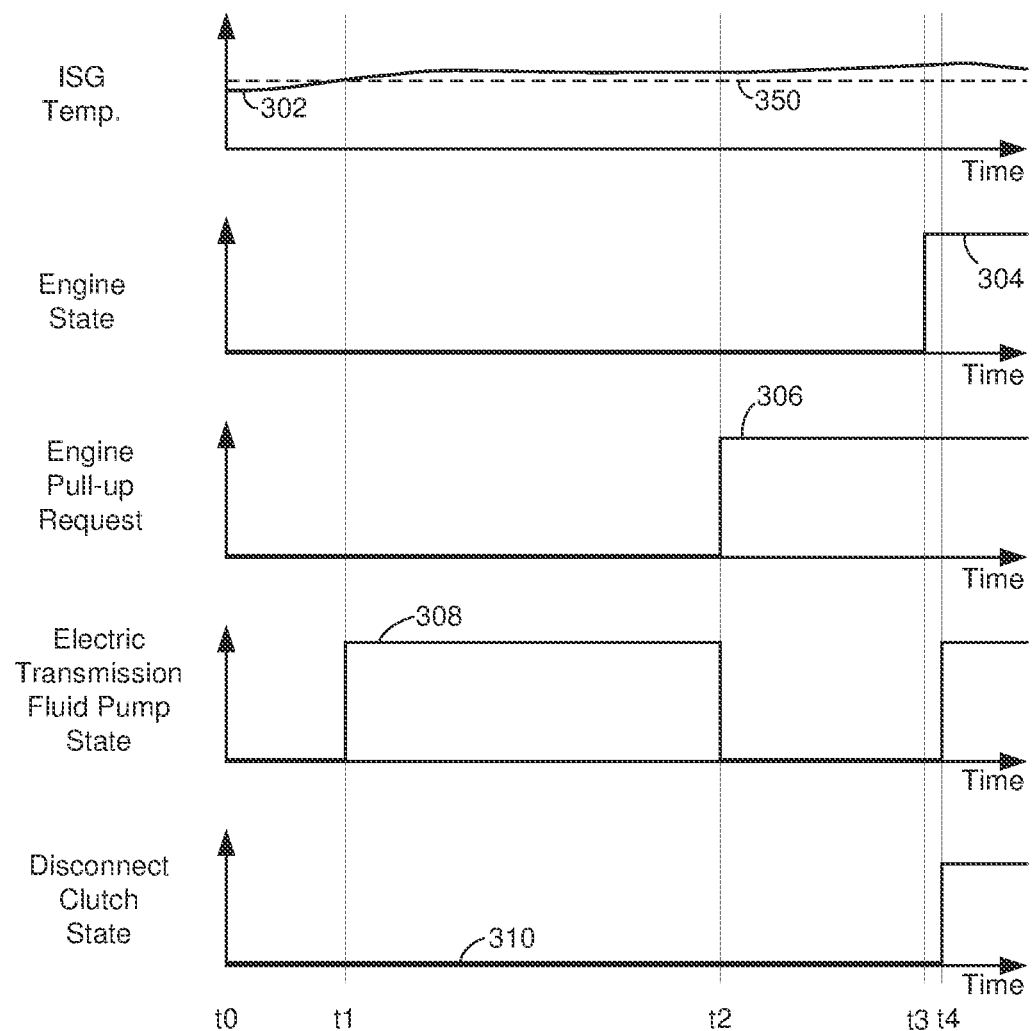
FIG. 3 shows example engine starting sequences according to the method of FIG. 4.
Figure 4:
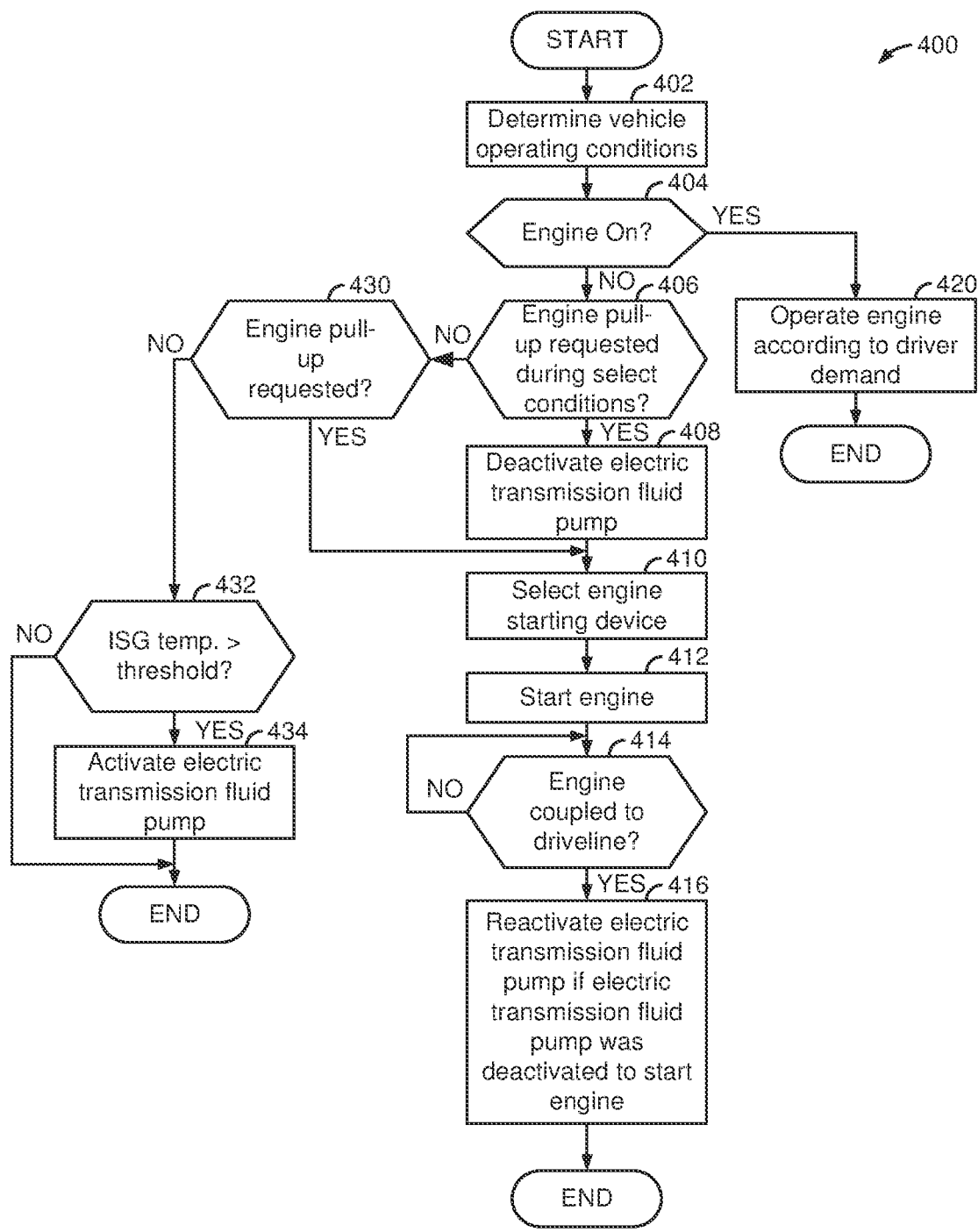
FIG. 4 shows a method for starting an engine of a hybrid vehicle.

The present description is related to improving starting of an engine of a hybrid vehicle. In particular, an electric transmission fluid pump may be deactivated in response to a request to pull-up an engine so that torque transfer capacity of a driveline disconnect clutch may be made more consistent. The driveline disconnect clutch may be closed from an open state so that engine torque may be transferred to the driveline or so that an integrated starter/generator may begin to rotate the engine so that the engine may be started. Once the driveline disconnect clutch is fully closed, the electric transmission fluid pump may be reactivated so that the integrated starter/generator may be cooled. The engine may be of the type that is shown in FIG. 1. The engine may be part of a hybrid powertrain or driveline as shown in FIG. 2. An operating sequence according to the methods of FIG. 4 is shown in FIG. 3. FIG. 4 shows a flowchart of methods for controlling engine starting when a vehicle is operating in creep mode, launching, or stationary.

Referring to FIG. 1, internal combustion engine 10, comprising a plurality of cylinders, one cylinder of which is shown in FIG. 1, is controlled by electronic controller 12 (e.g., an engine controller). Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Flywheel starter 96 (e.g., low voltage (operated with less than 30 volts) electric machine) includes pinion shaft 98 and pinion gear 95. Pinion shaft 98 may selectively advance pinion gear 95 to engage ring gear 99. Flywheel starter 96 may be directly mounted to the front of the engine or the rear of the engine. In some examples, flywheel starter 96 may selectively supply torque to crankshaft 40 via a belt or chain. In one example, flywheel starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be hydraulic and/or electromechanical devices.

Fuel injector 66 is shown positioned to inject fuel directly into cylinder 34, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with engine air intake 42. Optional electronic throttle 62 adjusts a position of throttle plate 64 to control air flow from engine air intake 42 to intake manifold 44. In some examples, throttle 62 and throttle plate 64 may be positioned between intake valve 52 and intake manifold 44 such that throttle 62 is a port throttle. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Catalytic converter 70 can include multiple catalyst bricks, in one example. In another example, multiple emission control devices, each with multiple bricks, can be used. Catalytic converter 70 can be a three-way type catalyst in one example. Temperature of catalytic converter 70 (e.g., catalyst) may be monitored via temperature sensor 72.

Controller 12 may receive input data from and provide output data to human/machine interface 160. Human/machine interface 160 may be a touch screen display, keyboard, or other known interface. Controller 12 may provide and display system status information via human/machine interface 160. A human user may input requests for powertrain and passenger cabin climate controls to human/machine interface 160.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an driver demand pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a position sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Driveline 200 is shown including vehicle system controller 255, controller 12, electric machine controller 252, transmission controller 254, energy storage device controller 253, and brake controller 250. The controllers may communicate over controller area network (CAN) 299. In addition, vehicle system controller 255 may communicate with communications system 256 (e.g., a transceiver) so that vehicle 225 may communicate with a remote server (not shown) via cellular network, satellites, vehicle to vehicle communications network, or other radio frequency communications system. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to controller 12, electric machine controller 252, transmission controller 254, and brake controller 250 to achieve driver input requests and other requests that are based on vehicle operating conditions.

For example, in response to a driver (human or autonomous) releasing a driver demand pedal and vehicle speed, vehicle system controller 255 may request a desired wheel power or a wheel power level to provide a desired rate of vehicle speed reduction. The requested desired wheel power may be provided by vehicle system controller 255 requesting a first braking power from electric machine controller 252 and a second braking power from controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of the driveline and wheel rotation.

In other examples, the partitioning of controlling powertrain devices may be partitioned differently than is shown in FIG. 2. For example, a single controller may take the place of vehicle system controller 255, controller 12, electric machine controller 252, transmission controller 254, and brake controller 250. Alternatively, the vehicle system controller 255 and the controller 12 may be a single unit while the electric machine controller 252, the transmission controller 254, and the brake controller 250 are standalone controllers.

In this example, driveline 200 may be powered by engine 10 and electric machine 240. In other examples, engine 10 may be omitted. Engine 10 may be started with an engine starting system shown in FIG. 1 or via electric machine 240 also known as an integrated starter/generator (ISG). Further, power of engine 10 may be adjusted via power actuator 204, such as a fuel injector, throttle, etc.

Driveline 200 is shown to include an electric energy storage device 262. Electric energy storage device 262 may output a higher voltage (e.g., 48 volts) than electric energy storage device 263 (e.g., 12 volts). DC/DC converter 245 may allow exchange of electrical energy between high voltage bus 291 and low voltage bus 292. High voltage bus 291 is electrically coupled to higher voltage electric energy storage device 262. Low voltage bus 292 is electrically coupled to lower voltage electric energy storage device 263 and sensors/actuators/accessories 279. Sensors/actuators/accessories 279 may include but are not limited to front and rear windshield resistive heaters, vacuum pumps, climate control fans, and lights. Inverter 247 converts DC power to AC power and vice-versa to enable power to be transferred between electric machine 240 and electric energy storage device 262.

An engine output power may be transmitted to an input or first side of driveline disconnect clutch 235 through dual mass flywheel 215. Driveline disconnect clutch 236 may be hydraulically actuated via fluid (e.g., oil) that is pressurized via pump 283. A position of valve 282 (e.g., line pressure control valve) may be modulated to control a pressure (e.g., a line pressure) of fluid that may be supplied to driveline disconnect clutch pressure control valve 281. A position of valve 281 may be modulated to control a pressure of fluid that is supplied to driveline disconnect clutch 235. The downstream or second side 234 of driveline disconnect clutch 236 is shown mechanically coupled to electric machine input shaft 237.

Electric machine 240 may be operated to provide power to driveline 200 or to convert powertrain power into electrical energy to be stored in electric energy storage device 262 in a regeneration mode. Electric machine 240 is in electrical communication with electric energy storage device 262. Electric machine 240 has a higher output power capacity than flywheel starter 96 shown in FIG. 1. Further, electric machine 240 directly drives driveline 200 or is directly driven by driveline 200. There are no belts, gears, or chains to couple electric machine 240 to driveline 200. Rather, electric machine 240 rotates at the same rate as driveline 200. Electric energy storage device 262 (e.g., high voltage battery or power source, which may be referred to as a traction battery) may be a battery, capacitor, or inductor. The downstream side of electric machine 240 is mechanically coupled to the torque converter impeller 285 of torque converter 206 via shaft 241. The upstream side of the electric machine 240 is mechanically coupled to the disconnect clutch 236. Electric machine 240 may provide a positive power or a negative power to driveline 200 via operating as a motor or generator as instructed by electric machine controller 252.

Torque converter 206 includes a torque converter turbine 286 to output power to input shaft 270. Input shaft 270 mechanically couples torque converter 206 to automatic transmission 208. Torque converter 206 also includes a torque converter lock-up clutch 212 (TCC). Power is directly transferred from torque converter impeller 285 to torque converter turbine 286 when the torque converter lock-up clutch is locked. The torque converter lock-up clutch is electrically operated by controller 254. Alternatively, the torque converter lock-up clutch may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of automatic transmission 208. Alternatively, the torque converter lock-up clutch 212 may be partially engaged, thereby enabling the amount of power directly transferred to the transmission to be adjusted. The transmission controller 254 may be configured to adjust the amount of power transmitted by torque converter lock-up clutch 212 by adjusting the torque converter lock-up clutch in response to various engine operating conditions, or based on a driver-based engine operation request.

Torque converter 206 also includes pump 283 that pressurizes transmission fluid 295 to operate driveline disconnect clutch 236, forward clutch 210, and gear clutches 211. Pump 283 is driven via torque converter impeller 285, which rotates at a same speed as electric machine 240. In some examples, an electric transmission fluid pump 273 may also be provided to pressurize transmission fluid 295. The transmission fluid may be applied as a coolant to cool the electric machine 240 and apply/release driveline disconnect clutch 236. Line or conduit 248 may receive transmission fluid 295 from electric transmission fluid pump 273 and/or pump 283. Pressure in conduit 248 may be sensed via pressure sensor 249.

Automatic transmission 208 includes gear clutches 211 (e.g., gears 1-10) and forward clutch 210 that may be actuated via transmission fluid 295. Automatic transmission 208 is a fixed ratio transmission. Alternatively, automatic transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Parking pawl 296 may be engaged to prevent motion of output shaft 260 when automatic transmission 208 is in park. Transmission controller 254 selectively activates or engages torque converter lock-up clutch 212, gear clutches 211, and forward clutch 210. Transmission controller also selectively deactivates or disengages torque converter lock-up clutch 212, gear clutches 211, and forward clutch 210.

A frictional force may be applied to wheels 216 by engaging friction brakes 218. In one example, friction brakes 218 for wheels 216 may be engaged in response to a human driver pressing their foot on a brake pedal (not shown) and/or in response to instructions within brake controller 250. Further, brake controller 250 may apply friction brakes 218 in response to information and/or requests made by vehicle system controller 255. In the same way, a frictional force may be reduced to wheels 216 by disengaging friction brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure. A braking torque may be determined as a function of brake pedal position.

In response to a request to increase a speed of vehicle 225, vehicle system controller may obtain a driver demand power or power request from a driver demand pedal or other device. Vehicle system controller 255 then allocates a fraction of the requested driver demand power to the engine and the remaining fraction to the electric machine. Vehicle system controller 255 requests the engine power from controller 12 and the electric machine power from electric machine controller 252. If the electric machine power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter lock-up clutch 212 and engages gears via gear clutches 211 in response to shift schedules and torque converter lock-up clutch lockup schedules that may be based on input shaft power and vehicle speed. In some conditions when it may be desired to charge electric energy storage device 262, a charging power (e.g., a negative electric machine power) may be requested while a non-zero driver demand power is present. Vehicle system controller 255 may request increased engine power to overcome the charging power to meet the driver demand power.

In response to a request to reduce a speed of vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the electric machine 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears based on a unique shifting schedule to increase regeneration efficiency. Engine 10 and electric machine 240 may supply a negative power to transmission input shaft 270, but negative power provided by electric machine 240 and engine 10 may be limited by transmission controller 254 which outputs a transmission input shaft negative power limit (e.g., not to be exceeded threshold value). Further, negative power of electric machine 240 may be limited (e.g., constrained to less than a threshold negative threshold power) based on operating conditions of electric energy storage device 262, by vehicle system controller 255, or electric machine controller 252. Any portion of desired negative wheel power that may not be provided by electric machine 240 because of transmission or electric machine limits may be allocated to engine 10 and/or friction brakes 218 so that the desired wheel power is provided by a combination of negative power (e.g., power absorbed) via friction brakes 218, engine 10, and electric machine 240.

Accordingly, power control of the various powertrain components may be supervised by vehicle system controller 255 with local power control for the engine 10, automatic transmission 208, electric machine 240, and friction brakes 218 provided via controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from electric machine 240 by adjusting current flowing to and from rotor and/or armature windings of electric machine as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft rate of speed change. Transmission controller 254, controller 12, and vehicle system controller 255, may also receive addition transmission information from sensors 277, which may include but are not limited to pump output line pressure sensors, transmission hydraulic pressure sensors (e.g., gear clutch fluid pressure sensors), a transmission fluid temperature sensor, electric machine temperature sensors, gear selector position sensors, and an ambient temperature sensor. Transmission controller 254 may also receive requested gear input from gear selector 290 (e.g., a human/machine interface device). Gear selector 290 may include positions for gears 1-N (where N is an upper gear number), D (drive), R (reverse), and P (park) as indicated at 293.

Brake controller 250 receives wheel speed information via wheel speed sensor 221 and braking requests from vehicle system controller 255. Brake controller 250 may also receive brake pedal position information from position sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative electric machine power does not cause the wheel power limit to be exceeded. For example, if controller 250 issues a negative wheel power limit of 50 N-m, electric machine power is adjusted to provide less than 50 N-m (e.g., 49 N-m) of negative power at the wheels, including accounting for transmission gearing.

Thus, the system of FIGS. 1 and 2 provides for a system, comprising: an internal combustion engine; an integrated starter/generator; a disconnect clutch positioned in a driveline between the internal combustion engine and the integrated starter/generator; a transmission included in the driveline; an electric transmission fluid pump; and a controller including executable instructions stored in non-transitory memory that cause the controller to activate the electric transmission fluid pump in response to a temperature of the integrated starter/generator exceeding a threshold temperature, and that cause the controller to deactivate the electric transmission fluid pump in response to an engine pull-up request. In a first example, the system further comprises additional instructions to activate the electric transmission pump in response to the driveline disconnect clutch being fully closed. In a second example that may include the first example, the system further comprises additional instructions to start the internal combustion engine via an engine starting device in response to the engine pull-up request. In a third example that may include one or both of the first and second examples, the system includes where the engine starting device is the integrated starter/generator. In a fourth example that may include one or more of the first through third examples, the system includes where the engine starting device is a flywheel starter. In a fifth example that may include one or both of the first through fourth examples, the system includes where the engine pull-up request is a request to rotate the internal combustion engine via an electric machine at a time when engine rotational speed is zero.

Referring now to FIG. 3, a prophetic driveline operating sequence is shown. The operating sequence of FIG. 3 may be provided via the system of FIGS. 1 and 2 in cooperation with the method of FIG. 4. The vertical lines at times t0-t4 represent times of interest during the operating sequence. The plots are time aligned.

The first plot from the top of FIG. 3 is a plot of integrated starter/generator (ISG) temperature versus time. The vertical axis represents the integrated starter/generator temperature and the integrated starter/generator temperature increases in the direction of the vertical axis arrow. The horizontal axis represents time and time increases from the left side of the plot to the right side of the plot. Trace 302 represents the integrated starter/generator temperature. Horizontal dotted line 350 represents a threshold integrated starter/generator temperature above which the electric transmission fluid pump may be activated.

The second plot from the top of FIG. 3 is a plot of engine operating state versus time. The vertical axis represents the engine operating state. The engine is activated (e.g., rotating and combusting fuel) when trace 304 is at a higher level that is near the vertical axis arrow. The engine is not activated when trace 304 is at a lower level that is near the horizontal axis. The horizontal axis represents time and time increases from the left side of the plot to the right side of the plot. Trace 304 represents the engine operating state.

The third plot from the top of FIG. 3 is a plot of an engine pull-up request state versus time. The vertical axis represents the engine pull-up request state and the engine pull-up request state is asserted when trace 306 is at a higher level that is near the vertical axis arrow. The engine pull-up request state is not asserted when trace 306 is at a lower level that is near the horizontal axis. The horizontal axis represents time and time increases from the left side of the plot to the right side of the plot. Trace 306 represents the engine pull-up state.

The fourth plot from the top of FIG. 3 is a plot of an electric transmission fluid pump state versus time. The vertical axis represents the electric transmission fluid pump state and the electric transmission fluid pump state is asserted (e.g., on) when trace 308 is at a higher level that is near the vertical axis arrow. The electric transmission fluid pump state is not asserted when trace 308 is at a lower level that is near the horizontal axis. The horizontal axis represents time and time increases from the left side of the plot to the right side of the plot. Trace 308 represents the electric transmission fluid pump state.

The fifth plot from the top of FIG. 3 is a plot of a driveline disconnect clutch state versus time. The vertical axis represents the driveline disconnect clutch state and the driveline disconnect clutch state is asserted (e.g., fully closed) when trace 310 is at a higher level that is near the vertical axis arrow. The driveline disconnect clutch state is not asserted (e.g., open) when trace 310 is at a lower level that is near the horizontal axis. The horizontal axis represents time and time increases from the left side of the plot to the right side of the plot. Trace 310 represents the driveline disconnect clutch state.

At time t0, the engine is not started nor is it scheduled to be started. The integrated starter/generator (ISG) temperature is less than threshold 350 and the engine pull-up request is not asserted. The electric transmission fluid pump is not activated and the driveline disconnect clutch is open.

At time t1, the integrated starter/generator temperature exceeds threshold 350, which causes the electric transmission fluid pump to be activated. Activating the electric transmission fluid pump may allow greater amounts of transmission fluid to flow through and cool the integrated starter/generator. The engine is not running and it is not rotating. The engine pull-up request is not asserted. The driveline disconnect clutch remains open. The vehicle may be operating in an electric creep mode where the integrated starter/generator provides sufficient torque to propel the vehicle at a low speed (e.g., 3 kilometers/hour) shortly after a brake pedal of the vehicle has been released, thereby allowing the vehicle to move from rest on a flat road surface to the low speed. Alternatively, the vehicle may be stationary or in the process of launching (e.g., increasing vehicle speed from an initial vehicle speed of zero).

At time t2, the engine pull-up request is asserted, which causes the controller to deactivate the electric transmission fluid pump so that the driveline disconnect clutch torque capacity may be made more consistent during closing of the driveline disconnect clutch. The controller (not shown) also selects an engine starting device (not shown) in response to the engine pull-up request being asserted. The driveline disconnect clutch remains open and the engine remains stopped (e.g., not combusting fuel and not rotating). Shortly after time t2, the engine begins to rotate (not shown) via torque provided by an electric machine (not shown).

At time t3, the engine is started and it is combusting fuel. The integrated starter/generator temperature remains above threshold 350 and the engine pull-up request remains asserted. The electric transmission fluid pump remains deactivated and the driveline disconnect clutch remains partially open.

At time t4, the driveline disconnect clutch is fully closed. The electric transmission fluid pump is activated so that the electrical transmission fluid pump may be cooled at a faster rate. The engine is running and the engine pull-up request remains asserted so that the engine may remain running.

In this way, an activated electric transmission fluid pump may be deactivated during engine starting to improve repeatability of driveline disconnect clutch torque capacity. The electric transmission fluid pump may be reactivated after the engine is started to promote integrated starter/generator cooling.

Referring now to FIG. 4, a method for operating an engine of a hybrid vehicle is shown. The method of FIG. 4 may be at least partially implemented as executable instructions stored in memory of one or more controllers in the system of FIGS. 1 and 2. Further, the method of FIG. 4 may include actions taken in the physical world to transform an operating state of the system of FIGS. 1 and 2. Additionally, the method of FIG. 4 may provide at least portions of the operating sequence shown in FIG. 3.

At 402, method 400 determines vehicle operating conditions. Vehicle operating conditions may include but are not limited to vehicle speed, driver demand torque or power, engine temperature, integrated starter/generator, and state of battery charge. Method 400 proceeds to 404.

At 404, method 400 judges whether the internal combustion engine is on (e.g., rotating and combusting fuel). If so, the answer is yes and method 400 proceeds to 420. Otherwise, the answer is no and method 400 proceeds to 406.

At 420, method 400 operates the engine according to driver demand torque/power and state of battery charge. In one example, method 400 may request engine torque/power and electric machine torque/power as a function of driver demand torque/power and battery state of charge. Method 400 proceeds to exit.

At 406, method 400 judges whether or not an engine pull-up is requested during select vehicle operating conditions. An engine pull-up may be requested during select vehicle operating conditions in response to a driver demand torque or power request that is generated via a driver applying the driver demand pedal, battery state of charge being less than a threshold charge amount, an emission system temperature, a level of stored fuel vapor, and other vehicle operating conditions. If method 400 judges that an engine pull-up is requested, the answer is yes and method 400 proceeds to 408. Otherwise, the answer is no and method 400 proceeds to 430. The select vehicle operating conditions may include when the vehicle be stationary, in a creep mode and traveling at a creep speed (e.g., a speed that the vehicle travels after a vehicle is stopped and the vehicle's brake pedal is released without the drive demand pedal being applied after the time when the brake pedal was released), or launching.

At 408, method 400 deactivates the electric transmission fluid pump. The electric transmission fuel pump may be deactivated to improve the consistency of the torque transfer capacity of the driveline disconnect clutch. Activating the transmission pump may improve line pressure control, but if the transmission pump is allowed to selectively activate and deactivate prior to and during engine starting, disconnect clutch pressure may be inconsistent. This may lead to inconsistent disconnect clutch operation. Therefore, the electric transmission pump is deactivated to ensure a consistent driveline disconnect clutch response during engine starting. Method 400 proceeds to 410.

At 410, method 400 selects an electric machine for assisting starting of the engine. In one example, method 400 may reference a table or matrix according to vehicle operating conditions (e.g., vehicle drive mode, battery state of charge, vehicle speed, etc.) and the table or matrix outputs an electric machine that is to be applied to pull-up and start the engine. Method 400 proceeds to 412 after the engine starting device is selected.

At 412, method 400 rotates the engine via the selected electric machine. If the driveline integrated starter/generator is selected to start the engine, the driveline disconnect clutch may be partially closed so that torque may be transferred from the integrated starter/generator to the engine. Method 400 may also deliver spark and fuel to the engine so that the engine may start combusting fuel. The engine may be considered to be started when a speed of the engine exceeds a threshold speed. Once engine speed exceeds the threshold engine speed, the driveline disconnect clutch may be fully closed to couple the engine to the remainder of the driveline. Method 400 proceeds to 414.

At 414, method 400 judges whether or not the engine is coupled to the driveline by the driveline disconnect clutch being fully closed. The driveline disconnect clutch may be determined to be fully closed when a speed difference between a first side of the driveline disconnect clutch and second side of the driveline disconnect clutch is less than a threshold speed. If method 400 judges that the engine is coupled to the driveline by the driveline disconnect clutch, the answer is yes and method 400 proceeds to 416. Otherwise, the answer is no and method 400 returns to 414.

At 416, method 400 reactivates the electric transmission fluid pump if the electric transmission fluid pump was deactivated to start the engine. Method 400 may reactivate the electric transmission fluid pump by supplying electric power to the electric transmission fluid pump. Method 400 proceeds to exit.

At 430, method 400 judges whether or not an engine pull-up is requested. An engine pull-up may be requested in response to a driver demand torque or power request that is generated via a driver applying the driver demand pedal, battery state of charge being less than a threshold charge amount, an emission system temperature, a level of stored fuel vapor, and other vehicle operating conditions. If method 400 judges that an engine pull-up is requested, the answer is yes and method 400 proceeds to 410. Otherwise, the answer is no and method 400 proceeds to 432.

At 432, method 400 judges whether or not a temperature of the integrated starter/generator is greater than a threshold temperature. If so, the answer is yes and method 400 proceeds to 434. Otherwise, the answer is no and method 400 proceeds to exit.

At 414, method 400 activates the electric transmission fluid pump by supplying electric power to the electric transmission fluid pump. Activating the electric transmission fluid pump may allow additional amounts of transmission fluid to flow to the integrated starter generator so that the integrated starter/generator may be cooled. It should also be noted that method 400 may activate the electric transmission fluid pump during other conditions, such as when the vehicle is not moving and when the internal combustion engine is deactivated so that transmission clutches may be held in a desired state. Method 400 proceeds to exit.

In this way, a driveline disconnect clutch and electric transmission fluid pump may be activated and deactivated to improve driveline operation. If the electric transmission pump is not activated when an engine pull-up request is generated, the electric transmission pump may remain deactivated.

Thus, method 400 may select an engine starting device in response to an engine start request. If the driver demand pedal is not applied, the engine may be started via closing a driveline disconnect clutch. However, if the driver demand pedal is applied, the engine may be started via a flywheel starter. If pressure in a line supplying transmission fluid to a driveline disconnect clutch reaches a threshold pressure before the driver demand pedal is applied, the driveline disconnect clutch may be closed to start the engine. Because the line pressure is high, the torque that is delivered to the engine via the driveline disconnect clutch and an electric machine may be more repeatable.

The method of FIG. 4 provides for a method for operating a vehicle, comprising: via one or more controllers, deactivating an activated electric transmission fluid pump in response to an engine pull-up request; and via the one or more controllers, starting an engine of the vehicle via an engine starting device after deactivating the activated electric transmission fluid pump. In a first example, the method includes where the engine starting device is an integrated starter/generator. In a second example that may include the first example, the method includes where the engine starting device is a flywheel starter. In a third example that may include one or both of the first and second examples, the method further comprises closing a driveline disconnect clutch to start the engine. In a fourth example that may include one or more of the first through third examples, the method includes where the engine pull-up request is generated when the vehicle is operating in a creep mode. In a fifth method that may include one or more of the first through fourth examples, the method includes where the engine pull-up request is generated when the vehicle is being launched. In a sixth method that may include one or more of the first through fifth examples, the method includes where the engine pull-up request is generated when the vehicle is stationary. In a seventh method that may include one or more of the first through sixth examples, the method includes where the activated electric transmission fluid pump is activated in response to a temperature of an integrated starter/generator. In a eighth method that may include one or more of the first through seventh examples, the method includes where the temperature of the integrated starter/generator is greater than a threshold temperature.

The method of FIG. 4 also provides for a method for operating a vehicle, comprising: via one or more controllers, deactivating an activated electric transmission fluid pump in response to an engine pull-up request; and via the one or more controllers, reactivating the activated electric transmission fluid pump in response to a driveline disconnect clutch being fully closed. In a first example, the method further comprises rotating an engine via an electric machine in response to the engine pull-up request. In a second example that may include the first example, the method includes where the electric machine is a flywheel starter. In a third example that may include one or both of the first and second examples, the method includes where the electric machine is an integrated starter/generator. In a fourth example that may include one or more of the first through third examples, the method includes where the driveline disconnect clutch is positioned between an engine and an integrated starter/generator.

Note that the example control and estimation routines included herein can be used with various engine and/or vehicle system configurations. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a vehicle, comprising:
via one or more controllers,
detecting an engine pull-up request, and deactivating an electric transmission fluid pump from an activated state while an engine of the vehicle is stopped in response to the engine pull-up request;
maintaining a state where both the electric transmission fluid pump is deactivated and the engine of the vehicle is stopped simultaneously for a period of time after receiving the engine pull-up request and before starting the engine of the vehicle; and then
starting the engine of the vehicle via an engine starting device after deactivating the activated electric transmission fluid pump while the engine was stopped.

2. The method of claim 1, where the engine starting device is an integrated starter/generator.

3. The method of claim 1, where the engine starting device is a flywheel starter.

4. The method of claim 1, further comprising closing a driveline disconnect clutch to start the engine.

5. The method of claim 1, where the engine pull-up request is generated when the vehicle is operating in a creep mode.

6. The method of claim 1, where the engine pull-up request is generated when the vehicle is stationary.

7. The method of claim 1, where the activated electric transmission fluid pump is activated in response to a temperature of an integrated starter/generator greater than a threshold temperature, and wherein the temperature of the integrated starter/generator is still greater than the threshold temperature when the electric transmission fluid pump is deactivated in response to the engine pull-up request.

8. A system, comprising:
an internal combustion engine;
an integrated starter/generator;
a disconnect clutch positioned in a driveline between the internal combustion engine and the integrated starter/generator;
a transmission included in the driveline;
an electric transmission fluid pump; and
a controller including executable instructions stored in non-transitory memory that cause the controller to:
activate the electric transmission fluid pump while the internal combustion engine is stopped in response to a temperature of the integrated starter/generator exceeding a threshold temperature,
detect an engine pull-up request,
deactivate the electric transmission fluid pump while the internal combustion engine is still stopped in response to the engine pull-up request and while the temperature of the integrated starter/generator still exceeds the threshold temperature,
maintain a state where simultaneously the electric transmission fluid pump is deactivated, the internal combustion engine of the vehicle is stopped, and the temperature of the integrated starter/generator still exceeds the threshold temperature after receiving the engine pull-up request and before starting the internal combustion engine of the vehicle; and then
start the internal combustion engine via an engine starting device in response to the engine pull-up request.

9. The system of claim 8, further comprising additional instructions to activate the electric transmission fluid pump while the internal combustion engine is running after the start of the internal combustion engine in response to the disconnect clutch being fully closed, and wherein the engine pull-up request remains active while the internal combustion engine is running.

10. The system of claim 8, where the engine starting device is the integrated starter/generator.

11. The system of claim 8, where the engine starting device is a flywheel starter.

12. The system of claim 10, where the engine pull-up request is a request to rotate the internal combustion engine via an electric machine at a time when engine rotational speed is zero.

13. A method for operating a vehicle, comprising:
via one or more controllers,
detecting an engine pull-up request;
deactivating an activated electric transmission fluid pump while an engine of the vehicle is stopped in response to the engine pull-up request;
maintaining a state where both the electric transmission fluid pump is deactivated and the engine of the vehicle is stopped simultaneously for a period of time after receiving the engine pull-up request and before starting the engine of the vehicle; then
starting the engine responsive to the engine pull-up request after deactivating the activated electric transmission fluid pump; and
via the one or more controllers, reactivating the activated electric transmission fluid pump in response to a driveline disconnect clutch being fully closed.

14. The method of claim 13, further comprising rotating the engine via an electric machine to start the engine responsive to the engine pull-up request after deactivating the activated electric transmission fluid pump.

15. The method of claim 14, where the electric machine is a flywheel starter.

16. The method of claim 14, where the electric machine is an integrated starter/generator.

17. The method of claim 13, where the driveline disconnect clutch is positioned between the engine and an integrated starter/generator.

* * * * *